United States Patent [19]

Howland et al.

[11] Patent Number: 4,932,219
[45] Date of Patent: Jun. 12, 1990

[54] TRANSPORT REFRIGERATION SYSTEM WITH SELECTIVE RECEIVER TANK PRESSURIZATION

[75] Inventors: Leland L. Howland, Belle Plaine; Doyle G. Herrig, Elko, both of Minn.

[73] Assignee: Thermo King Corporation, Minneapolis, Minn.

[21] Appl. No.: 427,057

[22] Filed: Oct. 26, 1989

[51] Int. Cl.⁵ .............................. F25B 41/00
[52] U.S. Cl. ........................ 62/174; 62/239; 62/324.4
[58] Field of Search ............ 62/160, 174, 196.4, 62/239, 278, 324.1, 324.4, 324.6

[56] References Cited

U.S. PATENT DOCUMENTS

| | | | |
|---|---|---|---|
| 3,191,396 | 6/1965 | Ruddock | 62/174 X |
| 3,238,737 | 3/1966 | Shrader et al. | 62/174 |
| 3,301,001 | 1/1967 | McKinney | 62/174 X |
| 4,527,400 | 7/1985 | Greenheck et al. | 62/239 |
| 4,584,844 | 4/1986 | Lernal | 62/160 |
| 4,646,535 | 3/1987 | Taylor | 62/196.4 X |
| 4,685,306 | 8/1987 | Howland et al. | 62/117 |
| 4,706,468 | 11/1987 | Howland et al. | 62/199 |
| 4,711,095 | 12/1987 | Howland et al. | 62/117 |
| 4,712,283 | 12/1987 | Howland et al. | 62/200 |
| 4,748,818 | 6/1988 | Satterness et al. | 62/160 |

*Primary Examiner*—William E. Tapolcai
*Attorney, Agent, or Firm*—D. R. Lackey

[57] ABSTRACT

A transport refrigeration system having a compressor, condenser, receiver, and evaporator, for controlling the temperature of a served space via hot gas heating and cooling cycles. The receiver is selectively pressurized during a hot gas heating cycle, pressurizing the receiver at low ambient temperatures as sensed by compressor head pressure, and terminating or preventing receiver pressurization above a predetermined head pressure. This is useful for transport refrigeration systems which have a single compartment to condition, and it is even more useful in compartmentalized transport refrigeration systems having two or more compartments to condition.

11 Claims, 2 Drawing Sheets

4,932,219

TRANSPORT REFRIGERATION SYSTEM WITH SELECTIVE RECEIVER TANK PRESSURIZATION

TECHNICAL FIELD

The invention relates in general to refrigeration systems, and more specifically to transport refrigeration systems suitable for mounting on a truck or trailer.

BACKGROUND ART

Transport refrigeration units are called upon to control the temperature of a served space defined by a truck, trailer, container, and the like, to a selected set point temperature in a range between about −20 degrees F. and +70 degrees F., depending upon the cargo being transported. The selected set point temperature in this wide range must be achieved, notwithstanding that the ambient temperature may vary between the highest summer and lowest winter temperatures encountered during severe heat and cold waves.

To get more refrigerant into a heating cycle, it is common to pressurize the refrigerant receiver during a heating cycle, forcing refrigerant out of the receiver and into an active refrigerant circuit.

The problem of trapping refrigerant in the receiver, which is worse during low ambients, is even more critical when the transport refrigeration unit is serving a compartmentalized space, which includes two or more compartments to be conditioned. The main refrigeration unit serves the space directly adjacent to where the main unit is mounted, and the main refrigeration unit also serves remote spaces via remote evaporators disposed in such remote spaces. During low ambients weather caps or front shutters, such as the shutter arrangement disclosed in U.S. Pat. No. 4,527,400, are often used in order to increase the heating capacity of the unit. During high ambients, above about 50 degrees F., for example, there may be too much refrigerant in active circulation, especially in compartmentalized systems having one or more remote evaporators causing high compressor discharge or head pressures which may overload the compressor's prime mover. A throttling valve is usually required to control the amount of refrigerant returning to the compressor in order to prevent such overloads. If the compressor head pressure gets too high, a high pressure cut out (HPCO) detects the high pressure and either shuts down the prime mover, or disengages a clutch on systems having a clutch between the prime mover and compressor.

SUMMARY OF THE INVENTION

Briefly, the present invention is a transport refrigeration system in which the refrigerant receiver is selectively pressurized during a hot gas heating or defrost cycle, pressurizing the receiver only when pressurization is actually required. Prior art systems which pressurize the receiver do so during a hot gas heating or defrost cycle, whether or not more refrigerant is actually required in the active circuit.

The invention adds a solenoid valve RTPS to the receiver pressurizing line, and the solenoid valve is controlled by a pressure switch HPCS disposed to monitor the head or discharge pressure of the compressor. Below a predetermined compressor head pressure, which is well below the pressure setting of the high pressure cut out switch HPCO, switch HPCS will be closed, solenoid valve RTPS will be open, and the receiver tank will be pressurized during a hot gas heating or defrost cycle. Should the head pressure be below the predetermined value when a heating or defrost cycle is initiated, and the head pressure then exceeds the predetermined value during a heating or defrost cycle, switch HPCS will open and solenoid valve RTPS will close, terminating the pressurization of the receiver tank.

If the head pressure is above the predetermined head pressure when the associated refrigeration control initiates a hot gas heating or defrost cycle, switch HPCS will be open and solenoid valve RTPS will be closed, resulting in no receiver tank pressurization. If the head pressure falls below the predetermined value during the heating or defrost cycle, receiver tank pressurization will automatically be initiated.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
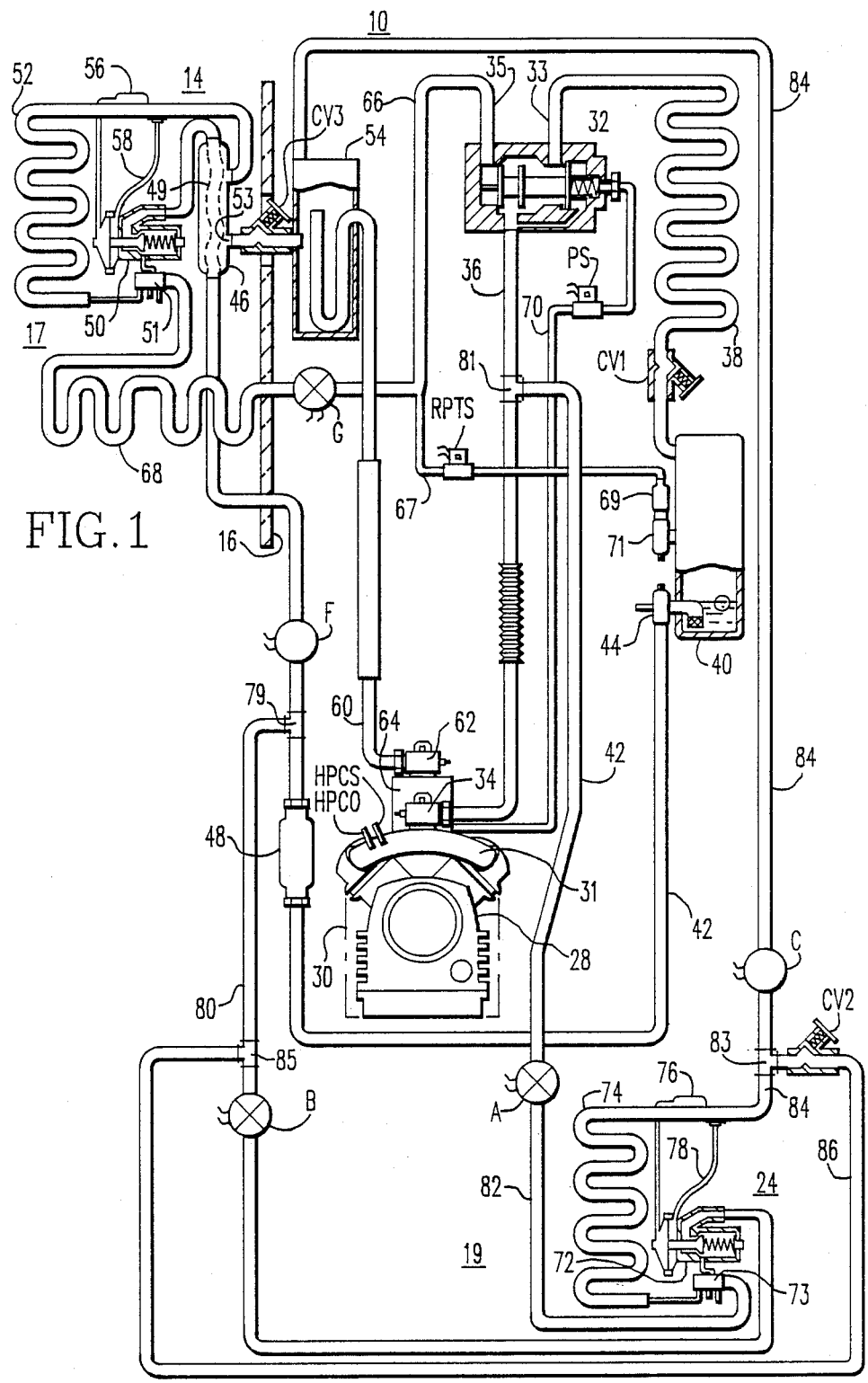
FIG. 1 is a schematic piping diagram of a transport refrigeration system constructed according to the teachings of the invention.

While the present invention is applicable to a transport refrigeration serving a single space or compartment, for purposes of example it will be described relative to a compartmentalized transport refrigeration system having first and second compartments. U.S. Pat. Nos. 4,685,306; 4,706,468; 4,711,095 and 4,712,383, which are assigned to the same assignee as the present application, disclose compartmentalized transport refrigeration systems which may be improved by the teachings of the invention. In order to limit the length and complexity of the present application, U.S. Pat. Nos. 4,685,306 and 4,706,468 are hereby incorporated into the specification of the present application by reference. Components in the present application which may be the same as in the incorporated application will be referred to with the same reference numerals.

Referring now to the drawings, and to FIG. 1 in particular, there is shown a schematic piping diagram of a transport refrigeration system 10. System 10 is associated with a trailer 16 having first and second compartments 17 and 19, respectively, to be conditioned. System 10 is under the control of a temperature controller 12 shown in FIG. 2, with controller 12 having temperature sensors 90 and 94 respectively disposed in compartments 17 and 19. Transport refrigeration system 10 includes a host refrigeration unit 14 which is controlled in response to temperature sensor 90, a remote evaporator unit 24 which is controlled in response to temperature sensor 94, and refrigerant piping between the two units. FIG. 1 also illustrates a plurality of controllable solenoid valves having open and closed positions, and check valves. While the solenoid valves will be referred to as having a specified normal de-energized position, it will be understood that the opposite de-energized position may be used by merely modifying the associated control accordingly.

The host refrigeration unit 14 includes closed fluid circuits which include a refrigerant compressor 28 driven by a prime mover such as an internal combustion engine, indicated generally by broken outline 30. A discharge manifold 31 of compressor 28 is connected to a refrigeration circuit selecting valve means 32 via a discharge service valve 34 and a hot gas line 36. Valve means 32 may be a three-way valve, as illustrated, or two separate valves, as desired. For the purposes of this description, valve means 32 will be described as a three-way valve, as illustrated.

Three-way valve 32 is controlled by a pilot solenoid valve PS. When pilot solenoid valve PS is deenergized, three-way valve 32 is biased to a position which directs hot gas from compressor 28 into a first refrigerant circuit 33. When pilot solenoid valve PS is energized, compressor pressure via a conduit 70 operates three-way valve 32 to a position which directs hot gas from compressor 28 into a second refrigerant circuit 35. The first refrigerant circuit 33 directs refrigerant in a closed loop which includes a condenser 38, a check valve CV1, a receiver 40, a liquid line 42, a drier 48, a normally open, liquid line solenoid valve F, a first path 49 through a heat exchanger 46, an expansion valve 50, a distributor 51, an evaporator 52, a second path 53 through heat exchanger 46, a check valve CV3, an accumulator 54, and a suction line 60 which is connected to the suction port of compressor 28 via a suction line service valve 62 and a suction throttling valve 64.

The accumulator 54 is not essential in all applications. The use of accumulator 54 assures vaporized refrigerant for compressor 28 in systems and/or ambients where slugging may be a problem.

The first refrigerant circuit 33 is the normal cooling circuit for the host refrigeration unit 14, removing heat from a trailer compartment 17 associated with host evaporator 52 and temperature sensor 90, and rejecting heat in condenser 38 to ambient.

When host evaporator 52 requires heat for defrosting, or for holding a selected set point temperature, as detected by sensor 90, controller 12 energizes pilot solenoid valve PS. Pressure from compressor 28 now operates three-way valve 32 which directs hot compressor gas to the second refrigerant circuit 35. The second refrigerant circuit 35 includes hot gas line 66, a normally closed hot gas solenoid valve G, a defrost pan heater 68, distributor 51, evaporator 52, the second path 53 through heat exchanger 46, check valve CV3, accumulator 54, and back to compressor 28 via suction line 60.

A receiver pressurizing tap 67 extends from hot gas line 66 to receiver 40 via a solenoid valve RPTS, a check valve 69, and a service valve 71. The use of solenoid valve RPTS in the pressurizing tap 67 is in accordance with the teachings of the invention, as will be hereinafter explained.

The remote evaporator unit 24 includes an expansion valve 72, a distributor 73 and an evaporator 74. Expansion valve 72 is connected to liquid line 42, between drier 48 and liquid line solenoid valve F, via a tee 79, and a remote liquid line 80 which includes a normally closed remote liquid line solenoid valve B. Distributor 73 is connected to hot gas line 36 via a tee 81, and a remote hot gas line 82 which includes a normally closed remote hot gas line solenoid valve A. The outlet of remote evaporator 74 is connected to a tee 83 via a remote suction line 84. One outlet of tee 83 is connected to a tee 85 located in remote liquid line 80, between remote liquid line valve B and tee 79, via a conduit 86 which includes a check valve CV2. While this outlet of tee 83 could be connected to the input side of receiver 40, there are definite advantages to connecting line 86 to remote liquid line 80. For example, line 86 does not have to be run all the way back to the receiver 40 which is located in the host unit 14, which facilitates adding the invention to a transport refrigeration unit in the field. Further, returning refrigerant to the remote liquid line 80 gets the refrigerant back into an active refrigeration circuit faster than returning it to the receiver 40.

The remaining outlet of tee 83 is connected to the accumulator 54 via a continuation of remote suction line 84 which includes a normally open remote suction line solenoid valve C.

A conventional high pressure cut out switch HPCO is located to monitor compressor head pressure, such as on the discharge manifold 31. According to the invention, a second pressure switch HPCS is also mounted to detect compressor head pressure, such as on the discharge manifold 31

Figure 2:
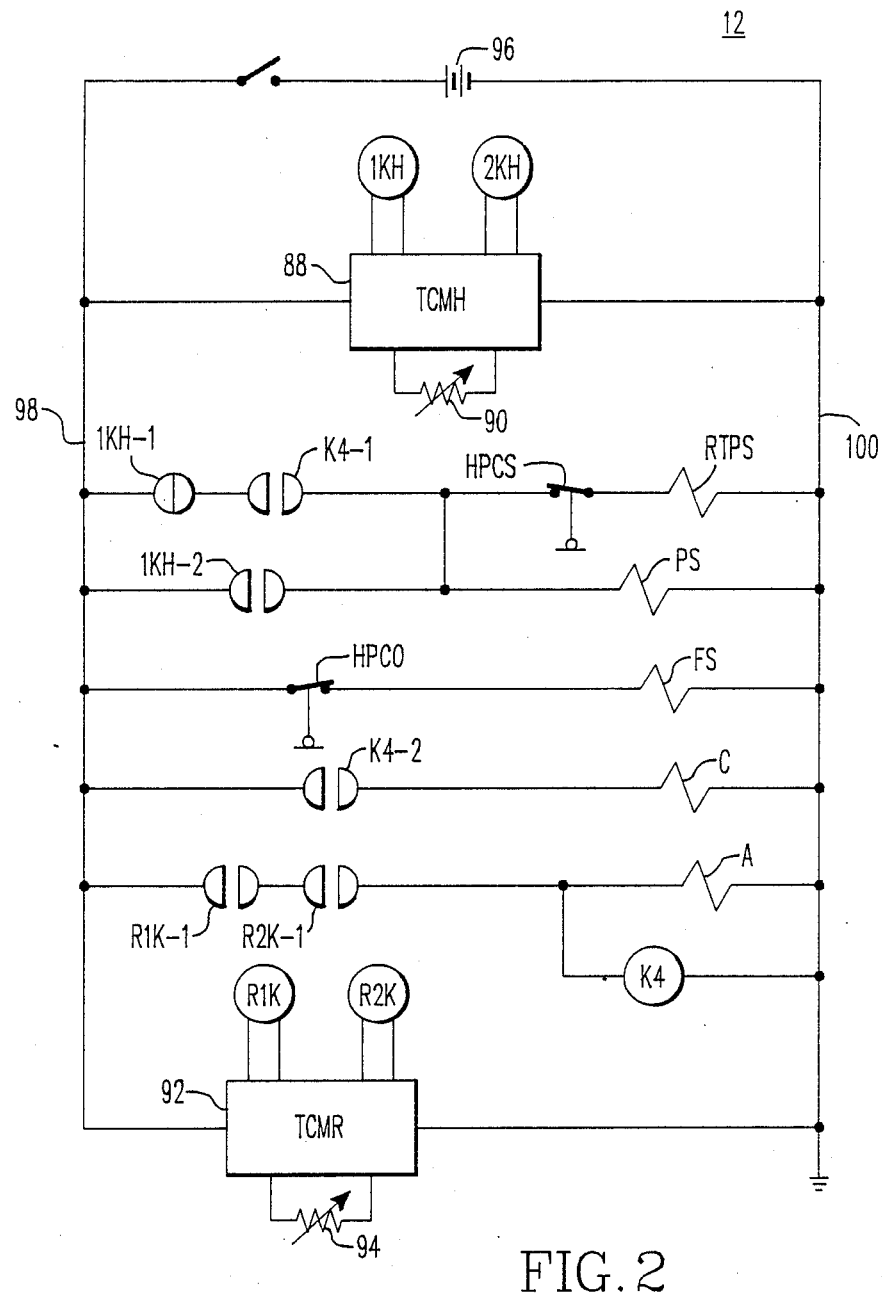
FIG. 2 is an electrical schematic diagram illustrating the control required to operate the transport refrigeration system according to the invention.

FIG. 2 is an electrical schematic diagram of the electrical components of host unit 14 and the remote unit 24, connected according to the teachings of the invention. The host unit includes a thermostat 88 having a temperature control module TCMH, the hereinbefore mentioned temperature sensor 90 disposed in the front compartment 17, a heat relay 1KH, and a speed relay 2KH. The incorporated patents illustrate control algorithms or sequences for operating relays 1KH and 2KH during both falling and rising temperatures relative to the selected set point temperature. When the speed relay 2KH is energized, the throttle of prime mover 30 is in a predetermined high speed position, such as 2200 RPM, and when the speed relay is de-energized, the throttle of the prime mover 30 is in a predetermined low speed position, such as 1400 RPM. When the heat relay 1KH is deenergized, a cooling cycle or mode is selected, and when the heat relay 1KH is energized, a heat cycle or mode is selected.

The remote unit 24 includes a thermostat 92 having a temperature control module TCMR, the hereinbefore mentioned temperature sensor 94 disposed in the rear compartment 19, a heat relay R1K and a speed relay R2K. Relays R1K and R2K operate as described relative to heat and speed relays 1KH and 2KH, respectively.

An electrical supply system, indicated generally by a battery 96 energizes a pair of conductors 98 and 100. The hereinbefore mentioned pilot solenoid PS is connected across conductors 98 and 100 via a first circuit which includes a normally open contact 1KH-2 of the host heat relay 1KH, and via a second circuit, which parallels the first circuit, with the second circuit including a normally closed contact 1KH-1 of the host heat relay 1KH and a normally open contact K4-1 of a relay K4 which is energized when the remote thermostat 92 calls for a heating or defrost cycle.

According to the invention, solenoid valve RTPS, which is disposed in the pressurizing tap 67, is connected across pilot solenoid PS via the second pressure switch HPCS. Switch HPCS is set to open when the compressor head pressure reaches a predetermined value, such as 200 PSIG. This is well below the setting of the high pressure cut out switch HPCO, which may be set at 425 PSIG, for example. The high pressure cut out switch HPCO, when it opens at the predetermined elevated compressor head pressure, protects the prime mover 30 from an excessive overload, as well as protecting compressor 28 against excessive head pressures, by stopping the prime mover 30, or by disengaging the prime mover 30 from compressor 28. For purposes of example, switch HPCO is shown connected to a fuel solenoid FS of the prime mover 30, shutting down the prime mover 30 in the event switch HPCO reaches its pressure setting and opens.

The remote suction line valve C is connected between conductors 98 and 100 via a normally open contact K4-2 of the remote heat relay K4. Valve C is normally open, closing when the remote thermostat 92 calls for a remote heating or defrosting cycle.

The remote hot gas solenoid A is connected between conductors 98 and 100 via a normally open contacts R1K-1 and R2K-1 of the heat and speed relays R1K and R2K, respectively. When the remote thermostat 92 calls for a heating cycle, contacts R1K-1 and R2K-1 will both be closed, energizing valve A, causing it to open and allow hot compressor gas to enter the remote evaporator. The remote heat relay K4 is connected across the remote hot gas solenoid A, and is energized when solenoid A is energized.

In the operation of transport refrigeration system 10 according to the teachings of the invention, when the host thermostat 88 calls for a cooling cycle, heat relay 1KH will be de-energized, pilot solenoid PS will be de-energized, and three-way valve 33 will direct refrigerant from compressor 28 through the first refrigerant circuit 33.

When the host thermostat 88 calls for a heating or defrosting cycle, heat relay 1KH will be energized closing its contact 1KH-2. Pilot solenoid PS will thus be energized to shift three-way valve 32 to its heating position in which hot compressor gas is circulated through the second refrigerant circuit 35. If the head pressure of compressor 28 is below the setting of pressure switch HPCS, indicating an ambient below about 50 degrees F., for example, switch HPCS will be closed and solenoid valve RTPS will be energized and open, allowing hot gas from hot gas line 66 to pressurize receiver 40 and force more refrigerant into the active system. If the head pressure of compressor 28 should rise to the setting of pressure switch HPCS during the heating cycle, switch HPCS will open, valve RTPS will become de-energized and close, terminating the pressurization of receiver 40. If the head pressure of compressor 28 is already higher than the setting of switch HPCS when a heating or defrosting cycle is initiated, switch HPCS will be open and valve RTPS will be closed, preventing pressurization of receiver 40.

If the remote thermostat 92 is calling for a cooling cycle, remote liquid line solenoid B will be energized to supply the remote evaporator 74 with liquid refrigerant from liquid line 42. Remote suction line solenoid will be de-energized and open, returning refrigerant to accumulator 54. If the host evaporator 52 requires cooling during this time, liquid line valve F will be open, and if it does not require cooling valve F will be closed.

If the remote thermostat 92 is calling for a heating or defrost cycle, remote liquid line solenoid valve B will be closed, remote hot gas solenoid valve A will be energized and open, remote heat relay K4 will be energized, and contact K4-2 of relay K4 will close to energize and close remote suction line valve C. Contact K4-1 will also be closed, as will contact 1KH-1 of the host heat relay, energizing pilot solenoid PS to switch three-way valve 32 to the heat position. This also enables the circuit which includes the second pressure switch HPCS and the solenoid valve RTPS, with the operation of this circuit being the same as hereinbefore described when the host unit 14 went into a heating cycle.

Hot gas solenoid valve G will be closed when the remote thermostat 92 calls for heat, to force all of the hot gas to the remote evaporator 74. Liquid line solenoid F will be open when the remote thermostat 92 calls for heat, thus forcing the host into a cooling cycle in which the remote evaporator 74 functions as a condenser for the host evaporator 52. During cold weather, the host evaporator 52 will actually cool better using the remote evaporator 74 as a condenser instead of the normal condenser 38, as the remote evaporator is smaller, resulting in an increased head pressure which gives the expansion valve 50 more of a pressure difference to work with.

During ambients associated with summer, pressure switch HPCS will be open all of the time, and solenoid valve RTPS will be closed, saving wear and tear on the solenoid valve RTPS. Also, unlike prior art receiver tank pressurizing arrangements, the receiver will not be pressurized, enabling the refrigeration circuit to operate without excess refrigerant which may overload the prime mover. During summer ambients, there is adequate refrigerant in the active system without pressurizing the receiver, as the refrigerant does not tend to collect in the receiver as the same rate as with lower ambients.

During cold weather, the second pressure switch HPCS will be closed and the solenoid valve RTPS open, again with little or no cycling, to pressurize the receiver during heating and defrost cycles, assuring that there will be adequate refrigerant in the active system, even when the transport refrigeration system is serving more than one compartment.

What is claimed:

1. In a transport refrigeration system having a thermostat which controls the temperature in a served space via heating and cooling cycles which use hot refrigerant gas, a refrigeration system which includes a compressor having discharge and suction manifolds, a condenser, a receiver, and an evaporator for the served space, the improvement comprising:
   first means responsive to the thermostat calling for a heating cycle in the served space for pressurizing the receiver,
   and second means disposed to monitor refrigerant pressure in the transport refrigeration system,
   said second means being operable at a predetermined pressure for terminating receiver pressurization, notwithstanding the thermostat calling for a heating cycle in the served space.

2. In the transport refrigeration system of claim 1 wherein the second means is responsive to the pressure in the discharge manifold of the compressor.

3. In the transport refrigeration system of claim 2, including a high pressure cut-out switch disposed to monitor the pressure of the discharge manifold of the compressor and to discontinue operation of the compressor at a predetermined pressure which is higher than the predetermined pressure which operates the second means.

4. In the transport refrigeration system of claim 1 wherein the first means pressurizes the receiver by admitting hot refrigerant gas into the receiver.

5. In the transport refrigeration system of claim 1 wherein the refrigeration system includes valve means which selects a first refrigerant circuit when the thermostat is not calling for a heating cycle, and otherwise a second refrigerant circuit, with the first means pressurizing the receiver via refrigerant from the second refrigerant circuit.

6. In a compartmentalized transport refrigeration system having at least first and second thermostats which respectively control the temperatures in at least first and second compartments via heating and cooling cycles which use hot refrigerant gas, a host refrigeration system which includes a compressor having discharge and suction manifolds, a condenser, a receiver, a local evaporator for the first compartment, and a remote refrigeration system which includes a remote evaporator for the second compartment, the improvement comprising:

first means responsive to a thermos calling for a heating cycle in a compartment for pressurizing the receiver, and second means disposed to monitor refrigerant pressure in the transport refrigeration system, said second means being operable at a predetermined pressure for terminating receiver pressurization, notwithstanding a thermostat calling for a heating cycle in a compartment.

7. In the compartmentalized transport refrigeration system of claim 6, wherein the second means is responsive to the pressure in the discharge manifold of the compressor.

8. In the compartmentalized transport refrigeration system of claim 7, including a high pressure cut-out switch disposed to monitor the pressure of the discharge manifold of the compressor and to discontinue operation of the compressor at a predetermined pressure which is higher than the predetermined pressure which operates the second means.

9. In the compartmentalized transport refrigeration system of claim 6 wherein the first means pressurizes the receiver by admitting hot refrigerant gas into the receiver.

10. In the compartmentalized transport refrigeration system of claim 6 wherein the host refrigeration system includes valve means which selects a first refrigerant circuit when neither the first or second thermostat are calling for a heating cycle, and otherwise a second refrigerant circuit, with the first means pressurizing the receiver via refrigerant from the second refrigerant circuit.

11. In the compartmentalized transport refrigeration system of claim 6 wherein the host refrigeration circuit includes hot gas, liquid and suction lines, the remote refrigeration circuit includes remote hot gas, remote liquid and remote suction lines, and including first, second and third valve means for selectively connecting the remote hot gas, remote liquid and remote suction lines to the hot gas, liquid and suction lines, respectively, with the remote suction line being blocked by the third valve means when the remote evaporator is in a heating cycle, and including means for connecting the remote suction line to the host liquid line when the remote suction line is blocked by the third valve means.

* * * * *